T. DEDIO.
SCISSORS CONSTRUCTION.
APPLICATION FILED OCT. 20, 1921.

1,436,948.

Patented Nov. 28, 1922.

Inventor
T. Dedio

By J. K. Bryant,
Attorney

Patented Nov. 28, 1922.

1,436,948

UNITED STATES PATENT OFFICE.

THOMAS DEDIO, OF DNIPRO, ALBERTA, CANADA.

SCISSORS CONSTRUCTION.

Application filed October 30, 1921. Serial No. 509,119.

*To all whom it may concern:*

Be it known that I, THOMAS DEDIO, a citizen of Poland, residing at Dnipro, in the Province of Alberta and Dominion of Canada, have invented certain new and useful Improvements in Scissors Construction, of which the following is a specification.

The primary object of the invention is the provision of a tape measure attachment for scissors whereby a tape measure will always be at hand when the operator is in possession of the pair of scissors, the device being easy and inexpensive to manufacture and not interfering with the usual cutting operation of the scissors.

A further object of the invention is the provision of an automatically rewound tape measure carried by a pair of scissors, the construction being such that the closing of the scissors automatically releases the tape measure for rewinding, provision being made for temporarily retaining the tape projected for use when desired.

With these general objects in view the invention consists of the novel combination and arrangement of parts hereinafter more fully described in connection with the accompanying drawing.

In the drawing, wherein like reference characters designate corresponding parts throughout the several views, Figure 1 is an elevational view of a pair of scissors or shears provided with my invention, parts being broken away;

Figure 1:
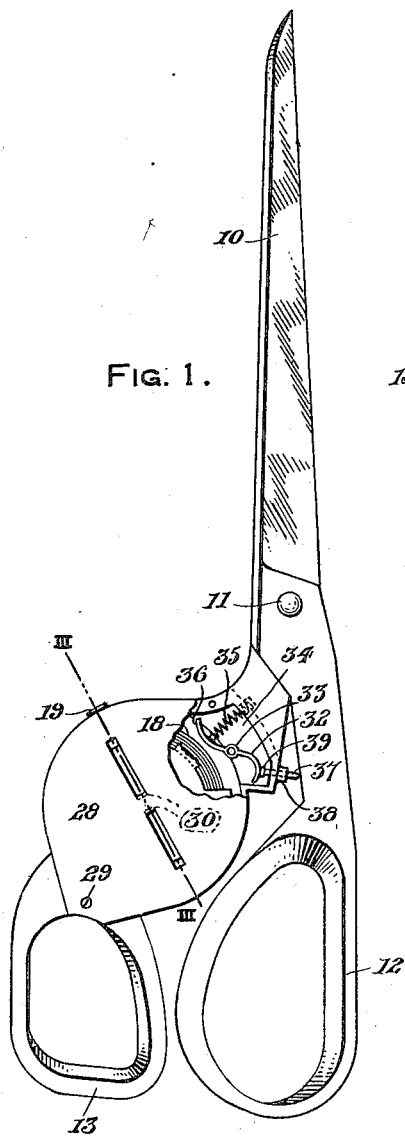

Referring more in detail to the drawing, a pair of scissors is illustrated having substantially the usual form of blade members 10 and 15 pivoted together at 11, the handle of the blade 10 being shown at 12 while the handle 13 of the other blade 15 has a substantially circular housing 14 adjacent its point of connection with the blade 15. A drum 16 formed of a single piece of sheet metal with upturned portions 17 formed slighty arcuate to constitute a drum upon which a tape measure 18 is adapted to be wound with one end of the tape measure secured to the drum in any desired manner and the opposite end having a button 19 serving as a stop outwardly of the exit slot 20 for the tape 18 in the outer side of the housing 14.

Figure 2:
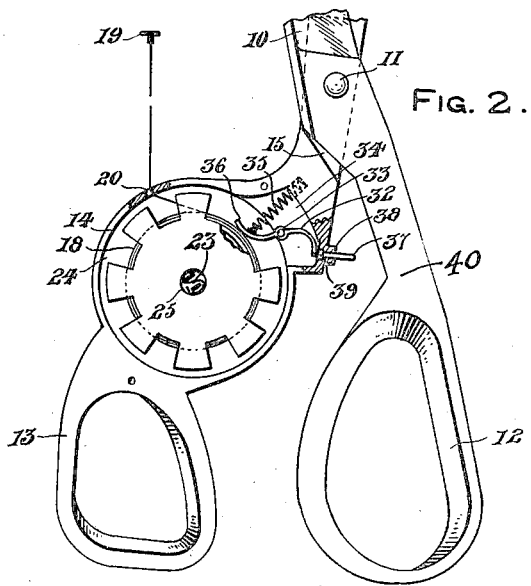
Fig. 2 is an enlarged view of the handle portions of the scissors with the tape partially withdrawn and the cover plate removed and parts also broken away.
Figure 3:
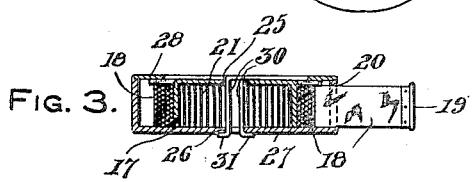
Fig. 3 is a transverse sectional view taken upon line III—III of Fig. 1.
Figure 4:
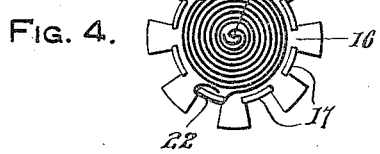
Fig. 4 is a detail view of the spring mounting means for the tape measure.
Figure 5:
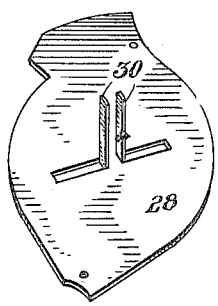
Fig. 5 is an inverted perspective view of the cover plate therefor.

A helical spring 21 positioned within the drum 16 has one end secured as at 22 to one of the upturned portions 17 while the opposite inner end of the spring 21 has an angular portion 23. A circular chamber 24 in the housing 14 is adapted to receive the drum 16 as illustrated in Fig. 2 and has a central opening 25 outwardly of the spring end 23 and in alinement with a similar opening 26 in the bottom 27 of said housing 14. A cover plate 28 is adapted for mounting on the housing 14 overlying the chamber 24 with the enclosed drum 16 and is secured in position by such means as screws 29. Inwardly projecting spurs 30 on the cover plate 28 project through the opening 25 of the drum 16, straddling the spring end 23 and passing through the bottom opening 26 of the housing 14 for outwardly turning in opposite directions as at 31 to hold the device assembled. From this description of the tape measure mechanism it will be seen that with the tape 18 projecting through the slot 20, a button 19 may be pulled for exposing any desired length of the tape for use outwardly of the housing 14 and upon releasing the tape, the spring 21 automatically returns the tape within the chamber 24.

An S-shaped lever 32 is pivoted at 33 in a side extension 34 of the chamber 24 while a spring 35 engages the inner end portion 36 of the lever 32 resiliently holding the same normally against the outer ply of tape 21 and whereby the tape will be temporarily prevented from automatic rewinding when pulled out for use. A plunger 37 is slidably positioned through an enlarged portion 38 of the housing 14 and has a head 39 normally engaging the adjacent outer end of the lever 32 and whereby the plunger 37 is normally retracted when the scissors are in their open position as shown in Fig. 2. Upon closing the handles 12 and 13 together, the shank portion 40 of the handle 12 engages the plunger 37, forcing the plunger inwardly and thereby rocking the lever 32 out of engagement with the tape 18. By this means it will be understood that when the tape 18 has been extended for use, the subsequent closing of the scissors releases the lever 32 from the tape 18 and permits the spring 21 to automatically rewind the tape upon the drum 16.

While the form of the invention herein set forth is believed preferable, it will nevertheless be understood that minor changes may be made therein without departing from the spirit and scope of the invention.

What is claimed as new is:—

1. In combination with a pair of scissors having a housing and a wound tape measure within the housing, holding means for the tape measure when projected, and means adapted for automatic release of the holding means upon closing the scissors.

2. In combination with a pair of scissors having a housing between one handle thereof and its cutting blade, a spring-wound tape measure journaled within the housing adapted for projecting outwardly thereof when desired for use, a spring-pressed lever within the housing in normal contact with the tape measure whereby the latter is adapted to be retained projected, and a releasing plunger for the lever projecting outwardly of the housing within the path of closing movement of the scissors whereby the plunger is adapted to be pushed in and the lever released automatically during the closing of the scissors and thereby permitting the automatic spring retraction of the tape measure.

3. In a pair of scissors having handles and blades, a housing positioned between one handle and its blade and provided with a chamber, a winding drum within the chamber, a coil spring within the drum having one end secured to the latter and the other end bent and positioned centrally thereof, a tape adapted for winding upon the drum extending outwardly of the housing, a cover plate for the housing having inwardly projecting spurs adapted for projecting through the drum straddling the angular end of the spring and secured to the bottom of the drum opposite said plate, an S-shaped lever pivoted within the chamber in normal resilient contact with the wound-up portion of the tape, and a releasing plunger for the lever projecting outwardly of the housing within the closing path of movement of the scissors.

4. In combination with a pair of scissors having blades provided with shanks and terminal handles, a housing carried by the shank of one handle having a chamber therein, a spring-actuated drum within the housing, a tape measure having one end secured to the drum adapted for winding on the latter and projecting outwardly of the housing, and controlling means for the tape adapted for automatic actuation by the shank of the other handle during the closing of the scissors.

5. In combination with a pair of scissors having blades provided with shanks and terminal handles, a housing carried by the shank of one handle having a chamber therein, a spring-actuated drum within the housing, a tape measure having one end secured to the drum adapted for winding on the latter and projecting outwardly of the housing, an S-shaped lever within the housing, a spring in contact with one end of the lever normally retaining the same in resilient contact with the outer ply of tape, and a plunger normally projecting outwardly of the housing having its inner end in contact with the other end of the lever whereby the tape is adapted for automatic release upon the closing operation of the scissors.

THOMAS DEDIO.